United States Patent [19]

Sasagawa

[11] Patent Number: 5,760,905
[45] Date of Patent: Jun. 2, 1998

[54] DISTANCE MEASURING APPARATUS

[75] Inventor: Jun Sasagawa, Tokyo, Japan

[73] Assignee: Kabushiki Kaisha Topcon, Tokyo, Japan

[21] Appl. No.: 730,291

[22] Filed: Oct. 11, 1996

[30] Foreign Application Priority Data

Oct. 13, 1995 [JP] Japan ................................ 7-265222

[51] Int. Cl.$^6$ ................................ G01B 11/14; G01C 3/00
[52] U.S. Cl. ........................ 356/375; 356/4.01; 356/3.04
[58] Field of Search ........................ 356/375, 4.01,
356/5.01, 5.1, 3.04, 3.06, 3.07; 250/221

[56] References Cited

U.S. PATENT DOCUMENTS

| | | | |
|---|---|---|---|
| 3,775,012 | 11/1973 | Ling et al. | 356/4.01 |
| 4,257,705 | 3/1981 | Hosoe et al. | 356/3.07 |
| 4,457,621 | 7/1984 | Harris et al. | 356/4.01 |
| 4,559,445 | 12/1985 | Hedin et al. | 250/203.1 |
| 4,782,239 | 11/1988 | Hirose et al. | 356/3.04 |
| 4,973,152 | 11/1990 | Brunk | 356/3.04 |
| 5,446,281 | 8/1995 | Taranowski et al. | 356/4.01 |
| 5,532,813 | 7/1996 | Ohishi et al. | 356/4.01 |

FOREIGN PATENT DOCUMENTS

| | | | |
|---|---|---|---|
| 2817237 | 10/1979 | Austria | 356/4.01 |
| 55-119082 | 9/1980 | Japan | 356/4.01 |
| 55-114567 | 11/1980 | Japan | 356/4.01 |

*Primary Examiner*—Frank G. Font
*Assistant Examiner*—Zandra V. Smith
*Attorney, Agent, or Firm*—Finnegan, Henderson, Farabow, Garrett & Dunner, L.L.P.

[57] ABSTRACT

A distance measuring apparatus is provided which is capable of not only reducing the cost of auxiliary separate parts but also making the apparatus small-sized and lightweight and improving the efficiency of operation in spite of the fact that both the measurements of long and short distances can be taken with the single apparatus. The distance measuring apparatus projects a measuring beam of light toward an object (14) to be measured by a light projecting system. Light reflected by the object (14) is imaged on a light receiving and converting device (16) by a light receiving system. A distance from a measuring position to the object (14) is measured based on the light imaged on the light receiving and converting device (16). If an object (17) to be measured is a reflecting sheet or natural substance, part of diffused and reflected light from the object (17) is deflected toward the light receiving and converting device (16) by a deflecting device (15) which is disposed apart from an optical axis (Q2) and close to the light receiving and converting device (16); disposed on an optical path which ranges from the object (17) to the light receiving and converting device (16).

18 Claims, 7 Drawing Sheets

PRIOR ART

FIG.6 (B)

PRIOR ART

DISTANCE MEASURING APPARATUS

BACKGROUND OF THE INVENTION

1. Field of the Invention

The present invention relates to a distance measuring apparatus, in particular, to a distance measuring apparatus for measuring a distance from a measuring position to an object to be measured such that visible/invisible light used as a measuring beam of light is irradiated toward the object and light reflected from the object is received by a receiving and converting means.

2. Description of the Related Art

There is known a distance measuring apparatus for measuring a distance from a measuring position to an object to be measured such that visible/invisible light or modulated light or pulse light, each used as a measuring beam of light, is irradiated toward the object and light reflected from the object is received by a receiving and converting means.

In general, this kind of distance measuring apparatus mainly comprises an optical portion for irradiating and receiving the measuring light and an electronic portion for measuring the distance by converting the measuring light received by the optical portion into an electronic signal.

The optical portion for irradiating and receiving the measuring light includes a light emitting portion for emitting the measuring light from a light source, an irradiating optical system for irradiating the measuring light toward the object, a light receiving optical system for guiding light reflected by the object, and a light receiving portion for receiving the reflected light guided by the light receiving optical system.

Figure 6:
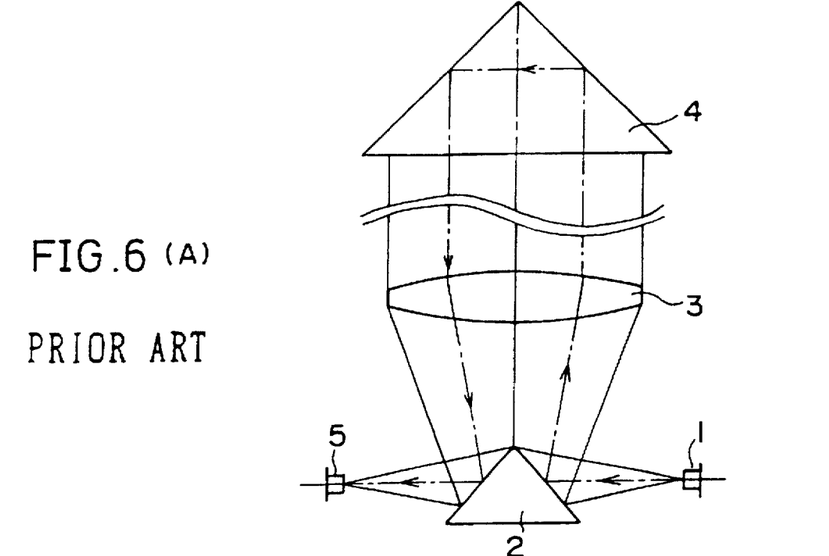
FIG. 6(A) is an optical explanatory view showing a conventional distance measuring apparatus in the case of performing long-distance measurement.
FIG. 6(B) is an optical explanatory view showing a conventional distance measuring apparatus in the case of performing short-distance measurement.

FIG. 6(A) is a schematic view showing an optical arrangement of this kind of distance measuring apparatus. In FIG. 6(A), a light emitting portion has a light source 1 for emitting measuring light. The measuring light is reflected by a reflecting mirror 2 and travels to an objective lens 3 serving as an irradiating optical system. The reflected measuring light becomes substantially parallel rays of light by means of the objective lens 3. An object 4 to be measured, which is disposed along an optical axis of the objective lens 3, receives and reflects the parallel measuring light. The parallel measuring light reflected by the object 4 travels to the objective lens 3.

The measuring light which again has passed through the objective lens 3 is reflected by the reflecting mirror 2 and is imaged on a light receiving means 5 of the light receiving portion.

As an object to be measured, use is made of, for example, a corner-cube prism (i.e., a retroreflection prism) mounted on the object 4 as shown in FIG. 6(A), a light reflecting sheet, or the object 4 itself.

As shown in FIG. 6(A), in the distance measuring apparatus of a single-lens type in which the single objective lens 3 is used commonly between the irradiating optical system and the light receiving optical system, the two optical systems are separated from each other by the objective lens 3, so that one of the optical systems is on the upper side and the other one is on the lower side, or one is on the right side and the other is on the left side, or one is on the inner side and the other is on the outer side. A twin-lens type of distance measuring apparatus is also known in which an irradiating optical system and a light receiving optical system have their respective objective lenses.

In the aforementioned distance measuring apparatus, there is a positional difference between the irradiating parallel light and the reflected parallel light, as shown in FIG. 6(A), if a corner-cube prism is used as the object 4 to be measured. For this reason, even if the irradiating optical system having the light source 1 and the light receiving optical system having the light receiving sensor 5 are not positioned on the same axis, the measurement can be taken regardless of the distance between the measuring position and the object to be measured, in other words, regardless of whether the distance is long or short.

On the other hand, if a light reflecting sheet or a natural object is an object 6 to be measured, as shown in FIG. 6(B), the measuring light which has struck the object 6 is reflected and diffused centering at a point J1 where the light has struck the object 6. The light reflecting sheet is provided with retroreflective fine ball-like glasses or fine prisms on a surface thereof. The natural object has certain reflection characteristics.

The measuring light which has struck the object to be measured is diffused reflection light. If a distance between the apparatus and the object to be measured is long, reflected light which is substantially parallel with the optical axis of the objective lens 3 enters the light receiving optical system. For this reason, the light receiving portion can receive reflected light necessary for the distance measurement even if the irradiating optical system and the light receiving optical system are individually disposed.

On the other hand, if the distance therebetween is short, the reflected and diffused light from the object to be measured which enters the light receiving optical system has a large inclination with respect to the optical axis of the objective lens 3. For this reason, the reflected light is difficult to be imaged on the light receiving sensor 5.

Accordingly, the objective lens 3 images the reflected light from the object 6 upon a position apart from the light receiving sensor 5. As a result, the quantity of light actually received by the light receiving sensor 5 is very small, so that the distance measurement becomes difficult.

The measuring method in which the light reflecting sheet or natural object is used as the object 6 to be measured is being demanded from a viewpoint of having a wide use, in other words, having no limit on what is measured in the above-mentioned light wave distance measuring apparatus using the laser light as the measuring light.

Figure 7A:
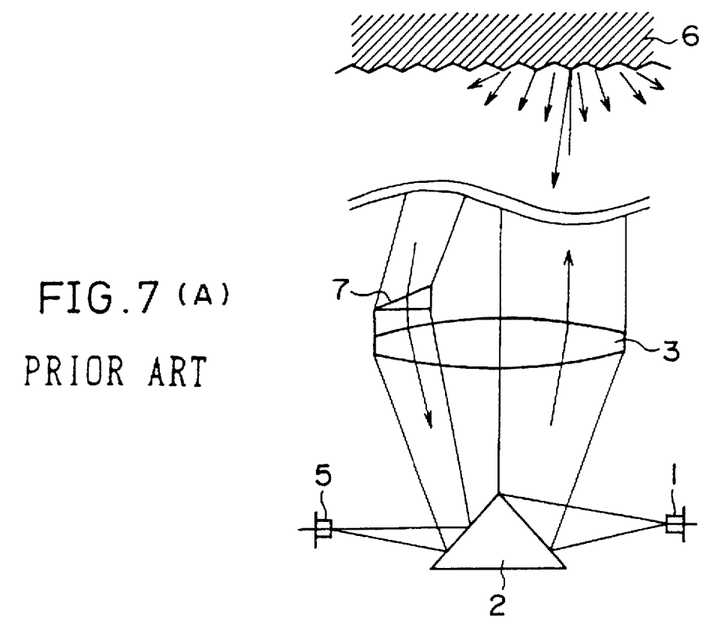
FIG. 7(A) is an optical explanatory view showing a conventional short-distance measuring apparatus in case of carrying out short-distance measurement by means of a prism.
Figure 7B:
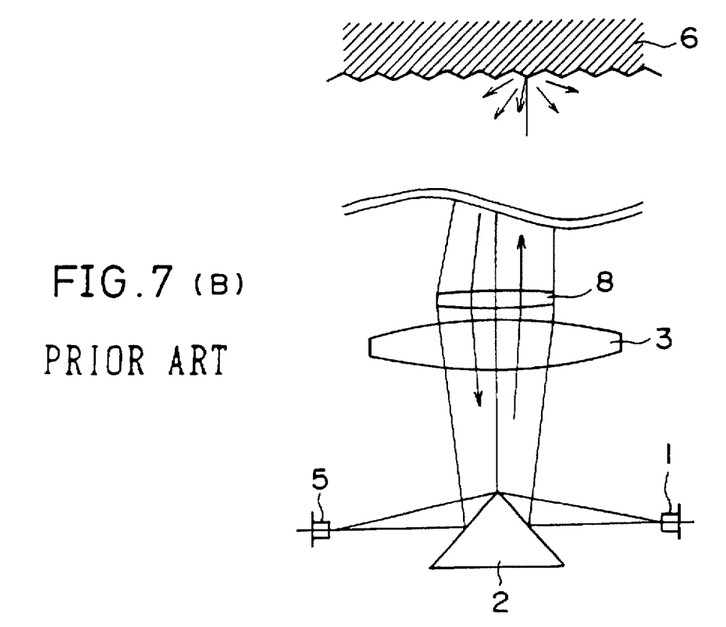
FIG. 7(B) is an optical explanatory view showing a conventional distance measuring apparatus in case of carrying out short-distance measurement by means of a lens.

Accordingly, it might be proposed that if short-distance measurement is performed using a light reflecting sheet or a natural object as the object 6 to be measured, a prism 7 (see FIG. 7(A)) or lens 8 (see FIG. 7(B)) for correction is disposed on an optical path between the objective lens 3 and the object 6 to be measured so that a part of reflected and diffused light from the object 6 by means of the prism 7 or the lens 8 is imaged on the light receiving material 5.

However, if the prism 7 or lens 8 is used, the prism 7 or lens 8 must be removed from the optical path when long-distance measurement is carried out and must be inserted into the optical path when short-distance measurement is carried out. For this reason, the added parts for correction bring about a new disadvantage that the cost rises and the body of the apparatus becomes large-sized and heavy.

Moreover, disadvantageously, the operation of removing and inserting the prism 7 or lens 8 is necessary besides the measuring operation. Further, erroneous operation might occur when the distance measurement is performed in the conditions under which, for example, the prism 7 or lens 8 is inserted regardless of the fact that use is made of the cornercube 4 as an object 6 to be measured, or the prism 7 or lens 8 is removed regardless of the fact that use is made of the light reflecting sheet or natural object as the object 6.

SUMMARY OF THE INVENTION

It is therefore an object of the present invention to provide a distance measuring apparatus in which long and short distance measurements can be carried out by the one apparatus, costs for added parts used for correction can be reduced, the body thereof can be made small-sized and light, and the efficiency of the measuring operation can be improved.

In order to achieve the object, there is provided a distance measuring apparatus which comprises a projecting system for irradiating a measuring beam of light toward an object to be measured, and a light receiving system for receiving reflected light reflected by the object to be measured by means of a light receiving and converting means, and measures a distance from a measuring position to the object to be measured based on the reflected light received by the light receiving and converting means. In the distance measuring apparatus, a deflecting means for deflecting at least a part of the reflected light is mounted near an optical path between the object to be measured and the light receiving and converting means.

Further, in order to achieve the object, there is provided a distance measuring apparatus which comprises a projecting system for irradiating a measuring beam of light toward an object to be measured, and a light receiving system for imaging reflected light from the object to be measured by means of a light receiving and converting means, and measures a distance from a measuring position to the object to be measured based on the reflected light imaged by the light receiving and converting means. In the distance measuring apparatus, a deflecting means is mounted near an optical path between the object to be measured and the light receiving and converting means, for deflecting at least a part of reflected light which is off the optical path toward the light receiving and converting means.

Preferably, the deflecting means is made of a light diffusing material.

Preferably, the deflecting means is made of a light reflecting material.

Preferably, the deflecting means is made of a light refracting material.

Preferably, the deflecting means is made of a light diffracting material.

Preferably, a measured object is a retroreflection prism mounted on the object to be measured.

Preferably, the retroreflection prism is a cornercube.

Preferably, a measured object is a light reflecting sheet mounted on the object to be measured.

Preferably, a measured object is the object to be measured itself.

DESCRIPTION OF THE PREFERRED EMBODIMENTS

First Embodiment

A first embodiment of a distance measuring apparatus of the present invention, which is applied to a light wave distance measuring apparatus, will be hereinafter described with reference to the accompanying drawings.

Figure 1A:
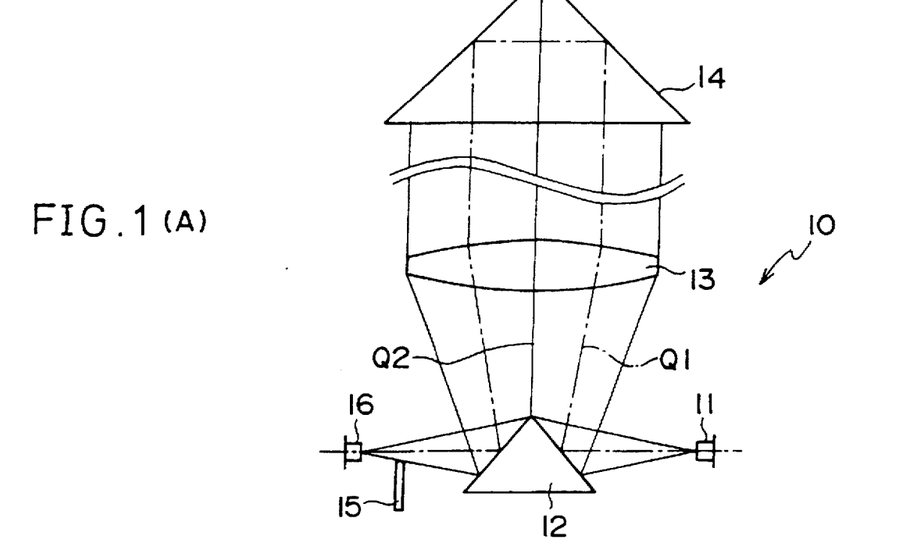
FIG. 1(A) is an optical explanatory view showing a distance measuring apparatus in the case of performing long-distance measurement according to a first embodiment of the present invention.
Figure 1B:
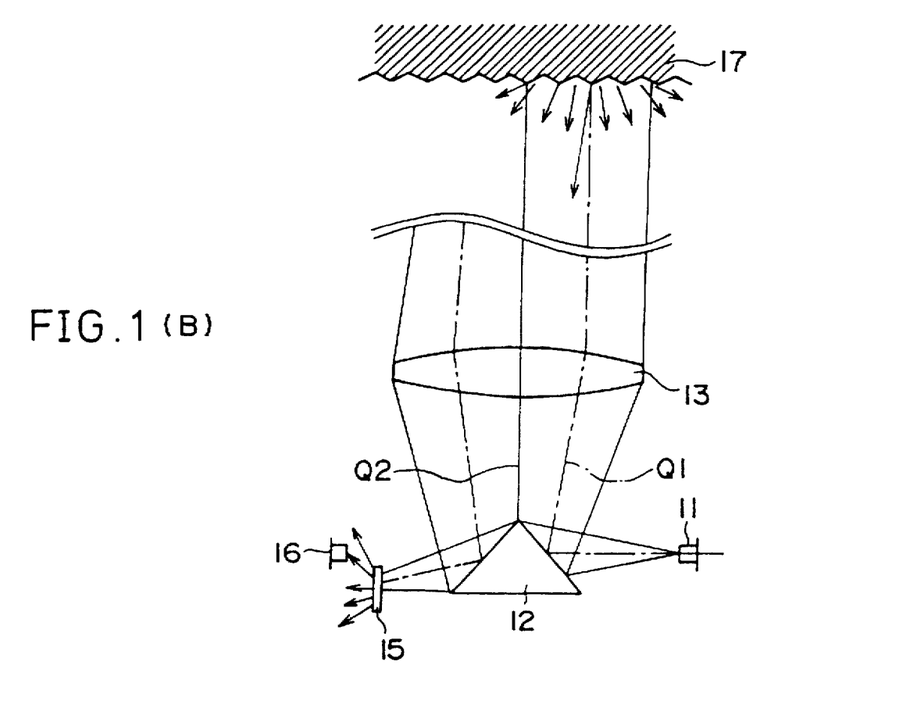
FIG. 1(B) is an optical explanatory view showing a distance measuring apparatus in the case of performing short-distance measurement according to the first embodiment of the present invention.

FIG. 1(A) is an optical view explaining normal measurement using a cornercube. FIG. 1(B) is an optical view explaining short-distance measurement using a light reflecting sheet or the like.

In FIG. 1(A), a distance measuring apparatus 10 comprises a light source 11, a reflecting mirror 12 for reflecting a measuring beam of light emitted from the light source 11, an objective lens 13 through which the measuring beam of light reflected by the reflecting mirror 12 becomes parallel rays of light, a cornercube 14 which is mounted on an object to be measured (not shown) and becomes an actually measured object, a deflecting means 15 made of a light diffusing material, such as ground glass, and a light receiving and converting means 16.

The light source 11 and the light receiving and converting means 16 are disposed on focusing positions of the objective lens 13. In FIG. 1(A), reference character Q1 denotes a central optical path of a light emitting system between the light source 11 and the cornercube 14 and a light receiving system between the cornercube 14 and the light receiving and converting means 16, and reference character Q2 denotes an optical axis of an optical system. The reflecting mirror 12 reflects the measuring beam of light along the axis Q2 and reflects the reflected light in a direction perpendicular to the axis Q2.

The light source 11 emits visible/invisible light, modulated light, or pulse light as the measuring beam of light. Emission timing of the light source 11 is controlled by a controlling portion (not shown).

The deflecting means 15 is disposed on a light receiving path between the objective lens 13 and the light receiving and converting means 16 and near the latter. The deflecting means 15 is apart from the optical path in order not to interrupt the reflected light in a case in which the reflected light incident on the objective lens 13 is normally imaged on the light receiving and converting means 16 without being deviated by the objective lens 13.

Instead of the ground glass, a deflecting means of a type capable of freely setting a diffusion direction and angle may be used as the aforementioned deflecting means 16. This type of deflecting means can cause the diffused and reflected light to be more effectively received by the light receiving and converting means 16.

When the distance to the object to be measured is measured, the cornercube 14 is previously mounted on the object to be measured so that the cornercube 14 becomes an actual object to be measured. A measuring beam of light from the light source 11 is then irradiated toward the cornercube 14. The measuring beam of light is reflected by the reflecting mirror 12 and passes through an incident side of the objective lens 13 and becomes parallel rays of light. After that, the parallel rays of light are reflected by the cornercube 14. At this time, the reflected light is parallel.

The parallel reflected rays of light are converged by a light receiving side of the objective lens 13 and are reflected by the reflecting mirror 12. The light reflected by the mirror 12 is imaged on the light receiving and converting means 16 and is taken out in the form of an electric signal. A distance to the object to be measured is measured by measuring and calculating portions (not shown).

On the other hand, as shown in FIG. 1(B), in short-distance measurement, if an object 17 to be measured is a light reflecting sheet or natural object, the measuring beam of light which has been emitted from the light source 11 and made parallel through the objective lens 13 becomes diffused and reflected light at an irradiated position of the object 17 to be measured as shown by arrows. For this reason, the reflected light entering the light receiving system has a large inclination with respect to the axis Q2.

Part of the diffused and reflected light obliquely enters the light receiving side of the objective lens 13 and is reflected by the reflecting mirror 12 as it is.

At this time, since a dislocation occurs on an imaging position because of oblique incidence on the objective lens 13, the reflected light converged on the objective lens 13 is imaged on a position where the reflected light from the reflecting mirror 12 does not directly enter the light receiving and converting means 16. Since the deflecting means 15 of the present invention, which serves to diffuse and transmit the beam of light, is disposed out of the axis immediately before the light receiving and converting means 16, the beam of light deflected by the deflecting means 15 enters the light receiving and converting means 16. The distance measurement can be performed based on this incident beam of light.

The beam of light incident on the light receiving and converting 16 is light obtained by further deflecting a part of the diffused and reflected light from the object 17 to be measured by means of the deflecting means 15. Since the object 17 to be measured is at a short distance, a case does not occur where the measurement cannot be performed for lack of a light quantity.

Accordingly, in the case of long-distance measurement, the measurement is performed based on the parallel light reflected by the cornercube 14 as the object to be measured. In the case of short-distance measurement, the measurement can be performed even if the object to be measured is the light reflecting sheet or natural object, etc. instead of the cornercube 14. In this case, even if the light reflecting sheet or natural object as the object to be measured has the light diffusing and reflecting characteristics, the distance measurement may be performed by the deflecting means 15 which is always fixed. Further, there is no need to provide the optical system on the light receiving side with a special driving means or the like.

Accordingly, long and short distance measurements can be performed by one apparatus. In the case of the short distance measurement, even if the object to be measured diffuses and reflects the measuring beam of light, the distance measurement can be performed. Additionally, there is no need to use a driving device for driving an optical member (deflecting means 15) used for short-distance measurement by which diffused and reflected light is guided to the light receiving and converting means 16. Thus, the cost can be reduced and a body of the apparatus can be made more small-sized and light. Moreover, since the optical members for short-distance measurement is fixed, regardless of the distance and the light reflecting characteristics of the object to be measured, the distance measurement can be performed by only one operation without the conventional pre-operation for inserting and removing the prism 7 or lens 8. Therefore, operational efficiency can be improved.

As mentioned above, in the distance measuring apparatus according to the present invention, the deflecting means for deflecting at least a part of the reflected light is disposed on the optical path between the object to be measured and the light receiving and converting means and near the latter. Therefore, the long and short distance measurements can be performed by one apparatus, and the costs for added parts for correction can be reduced. Additionally, the body of the apparatus can be made smaller and lighter, and operational efficiency can be improved.

Second Embodiment

Figure 2:
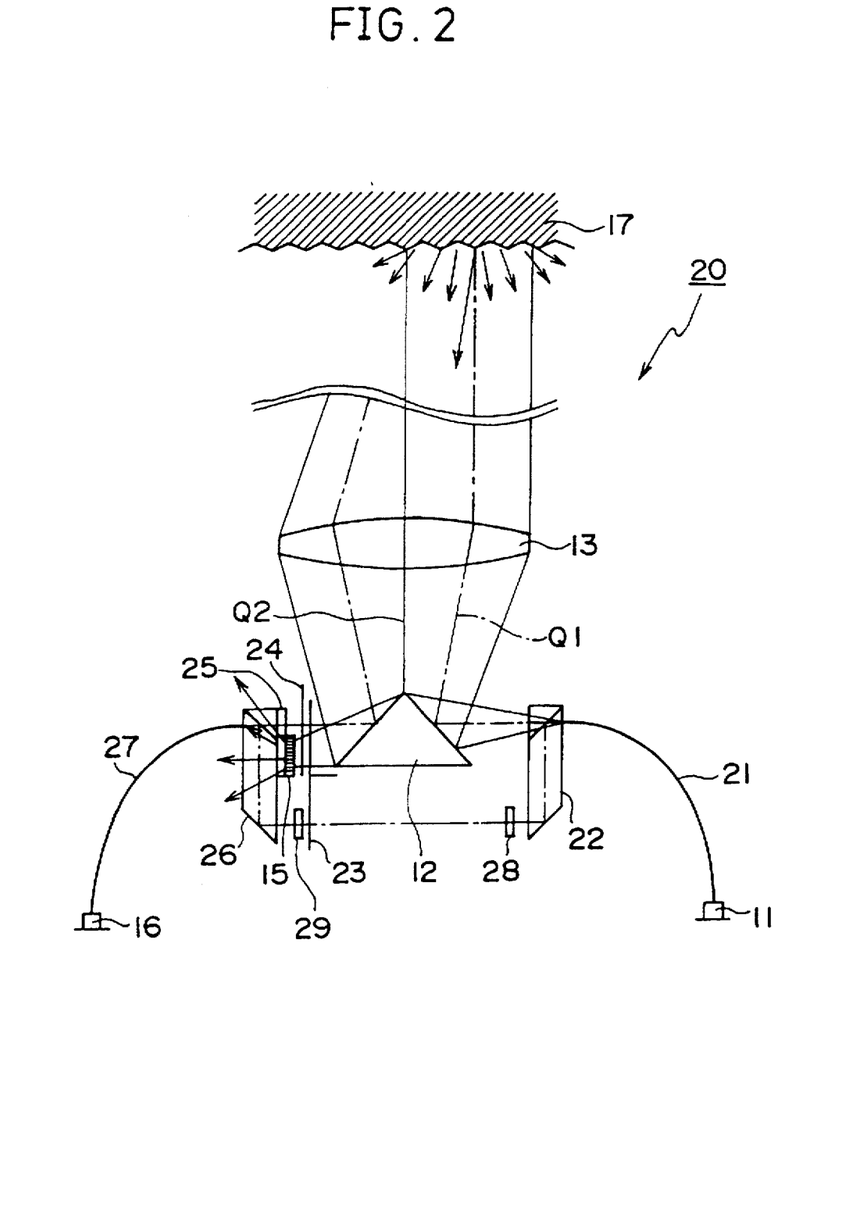
FIG. 2 is an optical explanatory view showing a distance measuring apparatus in the case of performing short-distance measurement according to a second embodiment of the present invention.

FIG. 2 shows a second embodiment of a distance measuring apparatus according to the present invention. The distance measuring apparatus in the second embodiment is more practical and concrete than that in the first embodiment. In the second embodiment, only the case of short-distance measurement is described. Since the distance measuring apparatus in the second embodiment is optically the same as that in the first embodiment, the same constituent parts are designated by the same reference characters, and the description thereof is omitted (same in the following third, fourth, fifth embodiments).

The distance measuring apparatus 20 comprises a light source 11, a light emitting fiber 21, a split prism 22, a reflecting mirror 12, an objective lens 13, an object 17 to be measured, a shutter 23, an ND filter 24, a deflecting means 15, a BPF (band pass filter) 25, a prism 26, a light receiving fiber 27, a light receiving and converting means 16, and lenses 28 and 29.

An irradiating beam of light emitted from the light source 11 passes through the light emitting fiber 21 and is split into measuring light and reference light by means of the split prism 22. The split measuring light is reflected by the reflecting mirror 12 and passes through the objective lens 13 and becomes parallel rays of light. The parallel rays of light are diffused and reflected by the object to be measured 17.

Part of the diffused and reflected light from the object 17 to be measured is converged by the light receiving side of the objective lens 13 and is reflected by the reflecting mirror 12. The reflected light passes through the shutter 23 which serves as a transmitting-switch of the measuring light and reference light and is adjusted to a certain quantity of light by the ND filter 24. After that, the adjusted light is deflected to the light receiving fiber 27 by the deflecting means 15.

Of the reflected light deflected by the deflecting means 15, only a part a wavelength of which corresponds to that of the light emitted from the light source 11 passes through the BPF 25 and the prism 26 which combines the measuring light and reference light. The part of the reflected light is then received by an end surface of the light receiving fiber 27. After that, light which have passed through the light receiving fiber 27 is received by the light receiving and converting means 16 and is taken out as an electronic signal. A distance to the object to be measured is measured by a measuring portion and a calculating portion (not shown).

On the other hand, the reference light of the light split by the split prism 22 is reflected by the split prism 22 and passes through the relay lens 28. By operating the transmitting-switch, the reference light passes through the shutter 21 and the relay lens 29. The reference light is then reflected and guided by the prism 26 and is imaged by the light receiving fiber 27 and is received by the light receiving and converting means 16. Thereby, the reference light emitted from the light source 11 is discerned.

If the object to be measured can be regarded as being distant infinitely, light reflected by the object to be measured is converged on the light-receiving side of the objective lens 13 and is reflected by the reflecting mirror 12. After that, the reflected light passes through the shutter 23, the ND filter 24, the BPF 25, and the prism 26 and is then imaged by the light-receiving fiber 27. After passing through the light-receiving fiber 27, the imaged light is received by the light receiving and converting means 16.

Third Embodiment

Figure 3:
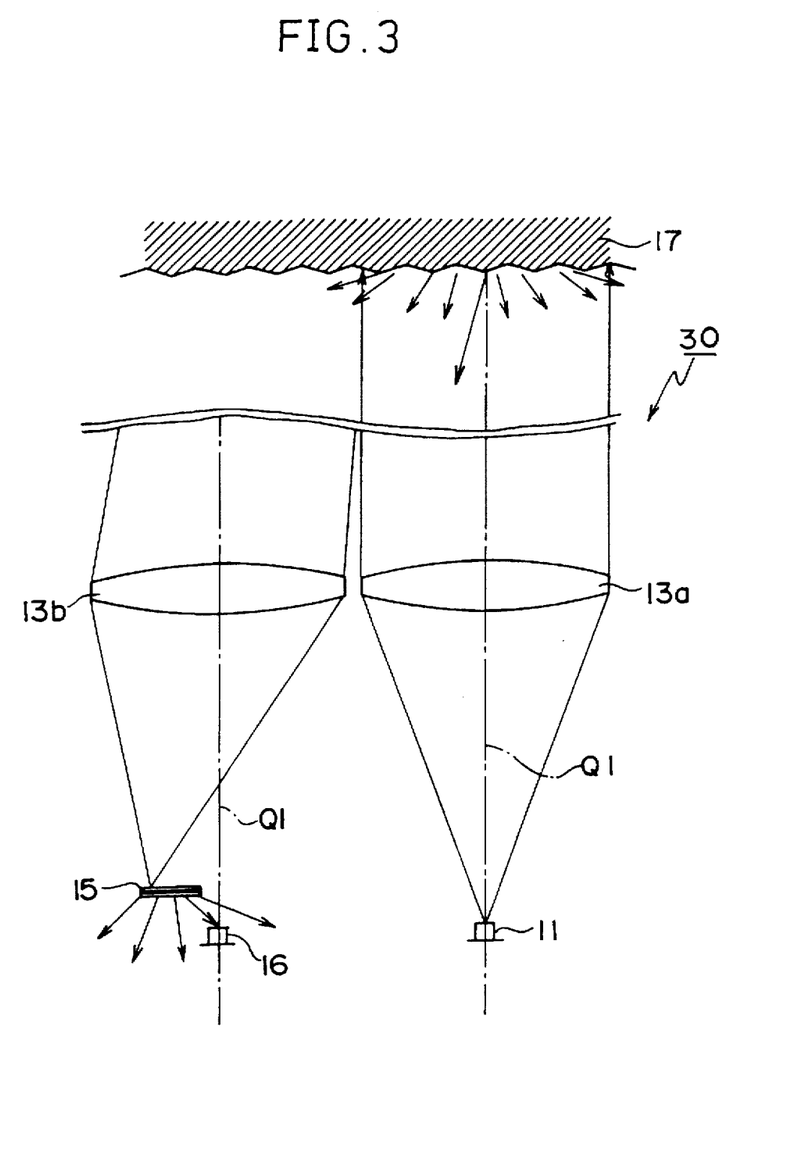
FIG. 3 is an optical explanatory view showing a distance measuring apparatus in the case of performing short-distance measurement according to a third embodiment of the present invention.

FIG. 3 shows a third embodiment of a distance measuring apparatus according to the present invention. In the first embodiment, the single-lens type of objective lens 13 is divided into a right-hand part and a left-hand part, and the two parts serve as a light-emitting side and a light-receiving side, respectively. In the third embodiment, a distance measuring apparatus 30 shown in FIG. 3 has a twin-lens type of objective lens 13a one of which serves as a light-emitting side and the other one serves as a light-receiving side respectively.

Except for this, the distance measuring apparatus 30 is substantially the same in optical construction as that in the first embodiment. Thus, the description of it is omitted.

Fourth Embodiment

Figure 4:
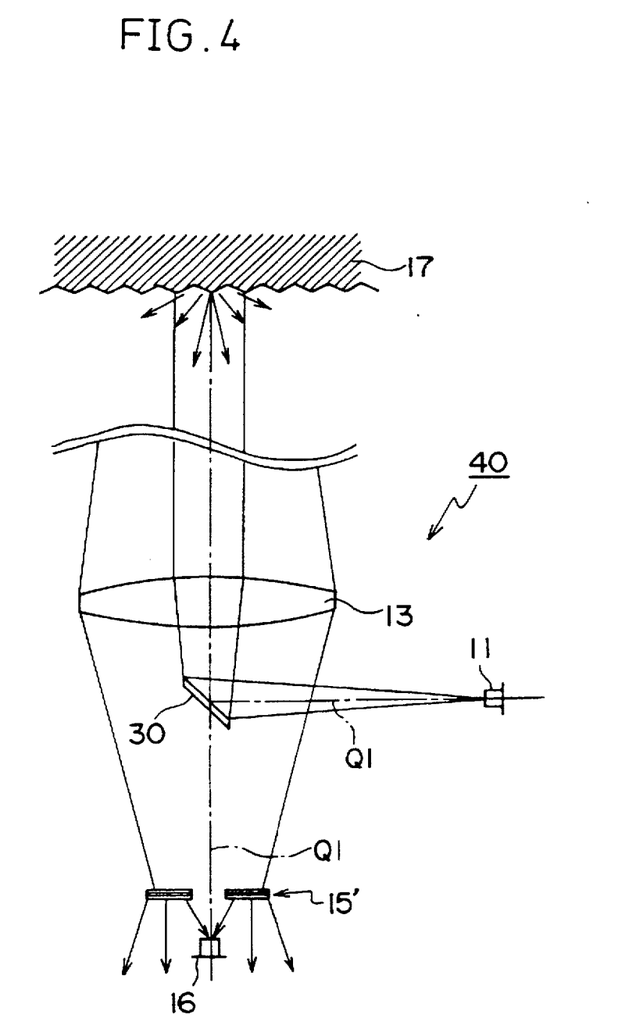
FIG. 4 is an optical explanatory view showing a distance measuring apparatus in the case of performing short-distance measurement according to a fourth embodiment of the present invention.

FIG. 4 shows a fourth embodiment of a distance measuring apparatus according to the present invention. In the fourth embodiment, an oblique mirror 30 is disposed on an axis of the objective lens 13. The oblique mirror 30 reflects a measuring beam of light emitted from the light source 11 so that the measuring beam of light becomes parallel rays of light having the same optical axis as that of the objective lens 13. Further, the light receiving and converting means 16 is disposed on the same axis as that of the objective lens 13. Accordingly, the measuring beam of light emitted from the light source 11 passes through the center of the objective lens 13 and strikes the object to be measured. After that, reflected light from the object to be measured passes through the periphery of the objective lens 13.

On the other hand, a deflecting means 15' having light diffusing characteristics is disposed nearby the light receiving and converting means 16. The deflecting means 15' is shaped like a ring the center of which has an opening so that the optical path can pass through it. It the object to be measured is distant enough to measure a distance, the reflected light is converged on the objective lens 13 and passes through the center opening of the deflecting means 15'. The reflected light is then imaged on the light receiving and converting means 16. If the object to be measured 17 is a light reflecting sheet or natural object, part of the diffused light is received by the light receiving and converting means 16 through the deflecting means 15'.

Fifth Embodiment

Figure 5:
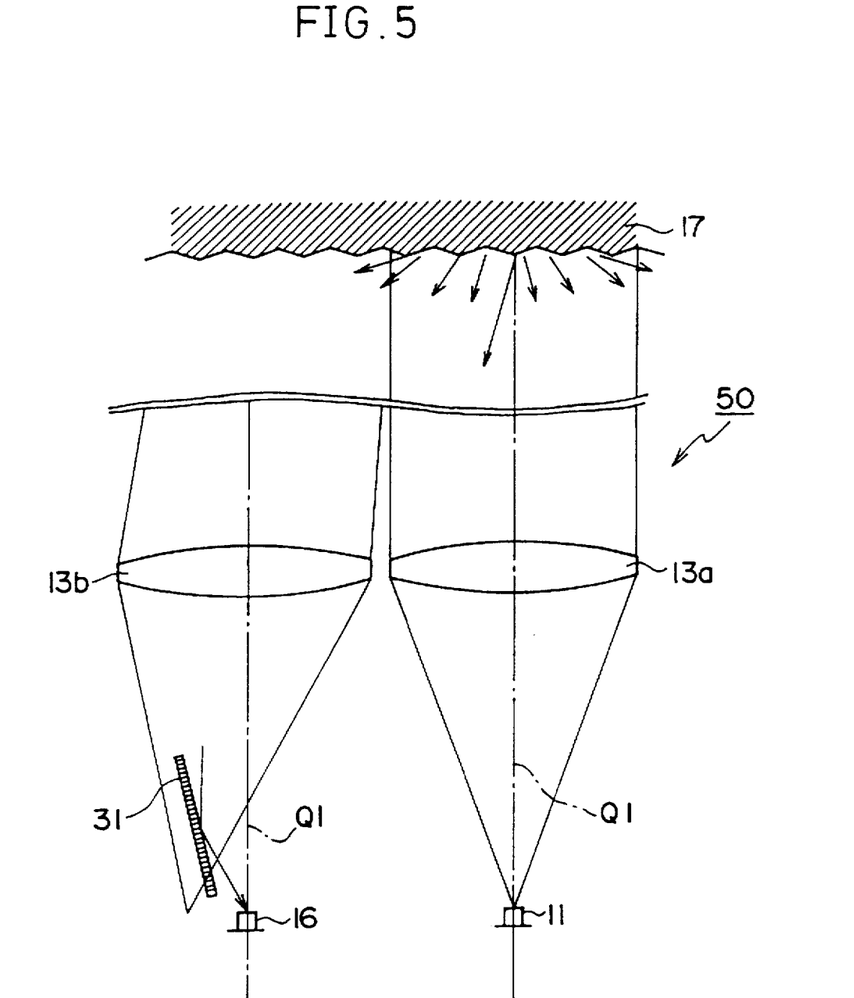
FIG. 5 is an optical explanatory view showing a distance measuring apparatus in the case of performing short-distance measurement according to a fifth embodiment of the present invention.

FIG. 5 shows a fifth embodiment of a distance measuring apparatus according to the present invention. A distance measuring apparatus 50 of the twin-lens type having the two objective lenses 13a, 13b shown in the third embodiment comprises a deflecting means 31 having light reflecting characteristics instead of the deflecting means 15 having light diffusing characteristics shown in the third embodiment. The deflecting means 31 is also applicable to the distance measuring apparatus of the single-lens type.

The deflecting means 31 is obliquely disposed (along or roughly along a direction in which light is converged by the objective lens 13) so as to guide reflected light to the light receiving and converting means 16. The deflecting means 31 may be shaped like a funnel with an upward opening around an optical axis Q2.

In the aforementioned embodiments, the deflecting means is described which has the light deflecting characteristics or the light reflecting characteristics. Instead, the deflecting means may be made of, for example, a light refracting material by which use is made of diffused light by a light diffusing sheet, emitted light by a prism or concave lens, or emitted light obtained after image-formation is carried out by a convex lens with a relatively short focusing distance.

Fresnel lenses or an array of lenses which are obtained by minimizing the aforementioned lenses and differing their refracting directions and are arranged on a surface may be used as the light retracting material. If a cylindrical lens is used in which the refracting directions of the aforementioned lenses are limited to one direction, diffused and reflected light can be more effectively guided to the light receiving and converting means 16.

Moreover, instead of this kind of light refracting material, use may be made of a light diffracting material for diffracting light by means of its diffraction gratings. In this case, by changing widths of the gratings in accordance with an incident position of the diffused and reflected light, the diffused and reflected light can be more effectively guided to the light receiving and converting means 16. Further, the aforementioned materials as the deflecting means may be combined with each other.

What is claimed is:

1. A distance measuring apparatus, comprising:

a light projecting system for projecting a measuring beam of light toward an object to be measured;

a light receiving system including light receiving and converting means for receiving light reflected by said object to be measured;

a distance from a measuring position to said object to be measured being measured based on reflected light received by said light receiving and converting means; and deflecting means, disposed close to an optical path ranging from said object to be measured to said light receiving and converting means, for deflecting a part of the reflected light.

2. A distance measuring apparatus according to claim 1, wherein said deflecting means is made of a light diffusing material.

3. A distance measuring apparatus according to claim 1, wherein said deflecting means is made of a light reflecting material.

4. A distance measuring apparatus according to claim 1, wherein said deflecting means is made of a light refracting material.

5. A distance measuring apparatus according to claim 1, wherein said deflecting means is made of a light diffracting material.

6. A distance measuring apparatus according to claim 1, wherein a measured object is a retroreflection prism mounted on said object to be measured.

7. A distance measuring apparatus according to claim 6, wherein said retroreflection prism is a corner-cube prism.

8. A distance measuring apparatus according to claim 1, wherein a measured object is a light reflecting sheet mounted on said object to be measured.

9. A distance measuring apparatus according to claim 1, wherein a measured object is said object to be measured itself.

10. A distance measuring apparatus, comprising:
   a light projecting system for projecting a measuring beam of light toward an object to be measured;
   light receiving and converting means for receiving light reflected by said object to be measured;
   a light receiving system for imaging light reflected by said object on said light receiving and converting means;
   a distance from a measuring position to said object to be measured being measured based on reflected light imaged on said light receiving and converting means; and
   deflecting means, disposed close to an optical path ranging from said object to said light receiving and converting means, for deflecting a part of the reflected light deviated from said optical path toward said light receiving and converting means.

11. A distance measuring apparatus according to claim 10, wherein said deflecting means is made of a light diffusing material.

12. A distance measuring apparatus according to claim 10, wherein said deflecting means is made of a light reflecting material.

13. A distance measuring apparatus according to claim 10, wherein said deflecting means is made of a light refracting material.

14. A distance measuring apparatus according to claim 10, wherein said deflecting means is made of a light refracting material.

15. A distance measuring apparatus according to claim 10, wherein a measured object is a retroreflection prism mounted on said object to be measured.

16. A distance measuring apparatus according to claim 15, wherein said retroreflection prism is a corner-cube prism.

17. A distance measuring apparatus according to claim 10, wherein a measured object is a light reflecting sheet mounted on said object to be measured.

18. A distance measuring apparatus according to claim 10, wherein a measured object is said object to be measured itself.

* * * * *